(12) United States Patent
Wang et al.

(10) Patent No.: US 11,656,379 B2
(45) Date of Patent: May 23, 2023

(54) METHODS TO ESTIMATE FORMATION SHEAR WAVE SLOWNESS FROM MULTI-FIRINGS OF DIFFERENT TYPES OF ACOUSTIC SOURCES AND MULTI-MODE DISPERSION ESTIMATION SYSTEMS

(71) Applicant: Halliburton Energy Services, Inc., Houston, TX (US)

(72) Inventors: Ruijia Wang, Singapore (SG); Jiajun Zhao, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 17/463,039

(22) Filed: Aug. 31, 2021

(65) Prior Publication Data

US 2023/0068510 A1 Mar. 2, 2023

(51) Int. Cl.
*G01V 1/30* (2006.01)
*G01V 1/00* (2006.01)
*G01V 1/34* (2006.01)
*G01V 1/28* (2006.01)

(52) U.S. Cl.
CPC .............. *G01V 1/303* (2013.01); *G01V 1/005* (2013.01); *G01V 1/282* (2013.01); *G01V 1/345* (2013.01)

(58) Field of Classification Search
CPC ........ G01V 1/303; G01V 1/005; G01V 1/282; G01V 1/345
See application file for complete search history.

(56) References Cited

U.S. PATENT DOCUMENTS

| | | | |
|---|---|---|---|
| 7,764,572 B2 | 7/2010 | Wu et al. | |
| 9,529,105 B2 * | 12/2016 | Collins | G01V 1/345 |
| 11,209,565 B2 * | 12/2021 | Wang | G01V 1/50 |
| 11,360,232 B2 * | 6/2022 | Wang | G01V 1/50 |

(Continued)

FOREIGN PATENT DOCUMENTS

| | | | | |
|---|---|---|---|---|
| GB | 2421079 A | * | 6/2006 | G01V 1/44 |
| WO | WO-2017172792 A1 | * | 10/2017 | G01V 1/303 |

(Continued)

OTHER PUBLICATIONS

International Search Report and Written Opinion dated May 24, 2022 in PCT/US2021/050524 filed on Sep. 15, 2021 (11 pages).

*Primary Examiner* — Daniel Pihulic
(74) *Attorney, Agent, or Firm* — Barnes & Thornburg, LLP (57) ABSTRACT

Methods to estimate formation shear wave slowness from multi-firings of different types of acoustic sources and multi-mode dispersion estimation systems are presented. The method includes obtaining waveform data of waves traversing through a downhole formation, where the waves are generated from multi-firings of different types of acoustic sources. The method also includes performing a multi-mode dispersion analysis of the waveform data for each firing of the multi-firings, and removing one or more tool waves generated from the multi-firings. The method further includes determining a formation type of the formation the waves traverse based properties of the waves and determining an initial shear wave slowness estimate of the waves. The method further includes generating a modeling of the waves, and reducing a mismatch between the modeling of the waves and a slowness dispersion of the waves to improve the modeling of the waves.

20 Claims, 7 Drawing Sheets

(56) References Cited

U.S. PATENT DOCUMENTS

| | | | |
|---|---|---|---|
| 2015/0049585 A1 | 2/2015 | Collins et al. | |
| 2015/0309200 A1 | 10/2015 | Zharnikov et al. | |
| 2019/0018161 A1* | 1/2019 | Wang | G01V 1/46 |
| 2019/0025452 A1 | 1/2019 | Wang et al. | |
| 2020/0341163 A1* | 10/2020 | Wang | G01V 1/50 |
| 2021/0208299 A1 | 7/2021 | Wang et al. | |
| 2021/0396901 A1* | 12/2021 | Zhao | G01V 1/282 |
| 2022/0252750 A1* | 8/2022 | Wang | G01V 1/284 |

FOREIGN PATENT DOCUMENTS

| | | | | |
|---|---|---|---|---|
| WO | 2020076308 A1 | 4/2020 | | |
| WO | WO-2020222760 A1 * | 11/2020 | | G01V 1/48 |
| WO | WO-2021257097 A1 * | 12/2021 | | G01V 1/44 |

\* cited by examiner

METHODS TO ESTIMATE FORMATION SHEAR WAVE SLOWNESS FROM MULTI-FIRINGS OF DIFFERENT TYPES OF ACOUSTIC SOURCES AND MULTI-MODE DISPERSION ESTIMATION SYSTEMS

The present disclosure relates generally to methods to estimate formation shear wave slowness from multi-firings of different types of acoustic sources and multi-mode dispersion estimation systems.

Acoustic wave processing methods sometimes utilize a single mode to estimate formation body wave slowness, such as to estimate formation shear wave slowness and formation compressional wave slowness. Such techniques sometimes utilize the lowest order of flexural waves to invert shear wave slowness in wireline logging. Similarly, one often uses the lowest order of screw waves to estimate shear wave slowness in the situation of logging while drilling. However, in some instances, for example, quadrupole logging-while-drilling data in a hard formation, or wireline dipole data in a large borehole, the dispersion curve of the first order, screw, or flexural waves may be affected by strong low-frequency road and drilling noise, resulting in missing the low-frequency asymptotes. In other cases, for example, wireline logging in a deviated well with a small size borehole, the first order of flexural waves may not be well developed.

BRIEF DESCRIPTION OF THE DRAWINGS

Illustrative embodiments of the present disclosure are described in detail below with reference to the attached drawing figures, which are incorporated by reference herein, and wherein:

FIG. 4D is a slowness density map for the waves of FIGS. 4A-4C and generated from the quadrupole, dipole, and monopole firings; and.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to methods to estimate formation shear wave slowness from multi-firings of different types of acoustic sources and multi-mode dispersion estimation systems. Multi-firings of different types of acoustic sources, including, but not limited to, monopole, dipole, quadruple, hexapole, and octupole signals are transmitted into a downhole formation. As referred to herein, multi-firings are the firings of two or more types of acoustic sources, such as, but not limited to, monopole and dipole, monopole, dipole, and quadrupole, or other combinations of two or more types of acoustic sources. Waveform data of waves traversing through a downhole formation are measured by a sonic logging tool disposed in a wellbore. In some embodiments, the sonic logging tool is a wireline logging tool and some of the operations described herein are performed during a wireline logging operation. In some embodiments, the logging tool is a logging-while-drilling sonic tool and some of the operations described herein are performed during a logging-while-drilling operation. In some embodiments, different acoustic sources are fired in a sequential order, such as monopole firings followed by dipole firings and follow by quadrupole firings. A multi-mode dispersion analysis is performed for each firing of the multi-firings. As referred to herein, multi-mode refers to multiple waves, such as a multi-mode analysis of the waveform data, and refers to analyzing multiple waves of the waveform data. In some embodiments, a multi-mode dispersion analysis is performed to obtain a semblance map of the waves. In one or more of such embodiments, the peaks of a semblance map are analyzed and the slowness dispersions of the waves are extracted from the peaks in the semblance map. In some embodiments, the slowness dispersions are obtained through a processing approach, such as through the Prony method or the Matrix-pencil method, without calculating a slowness-frequency semblance map.

One or more tool waves generated from the multi-firings of the different types of acoustic sources are removed. In some embodiments, the tool waves are removed from the semblance map and the candidate slowness dispersion peaks. A formation type of a formation the waves traverse through is then determined based on the properties of the waves. As referred to herein, the formation type of a formation refers to whether the formation shear wave speed is faster or slower than the mud compressional wave speed.

In some embodiments, the formation type of the formation is determined by analyzing and comparing the wave data generated by each firing of the multi-firings (such as monopole firings, dipole firings, and quadrupole firings). For example, where the multi-firings monopole firings, dipole firings, and quadrupole firings, the operations described herein are performed for each of the monopole, dipole and quadrupole firings. More particularly, assuming a first wave, a second wave, and a third wave are generated from a monopole firing, a dipole firing, and a quadrupole firing, a dispersion of a fundamental mode, and a refracted or a weak-dispersive high order mode of each of the first, second and third waves are extracted, a determination of whether the refracted shears or weak-dispersive high order mode of any of the waves exists is made, and the formation type is determined based on whether any of the refracted shears or weak-dispersive high order modes exist in the waves. As referred to herein, a fundamental mode refers to a first order guided wave, such as a first order screw wave of a quadrupole firing, or a first order flexural wave of a dipole firing. Further, an order of wave refers to a wave having a threshold cut-off frequency, where a higher order wave has a cut-off frequency that is greater than the cut-off frequency of a lower order wave. In one or more of such embodiments, a predicted shear of a fundamental mode of the waves generated from each firing of the multi-firings is also determined, and the formation type is also determined based on the predicted shear of the fundamental mode. In one or more of such embodiments, a final slowness density of the fundamental mode of the waves generated from each firing of the multi-firings is also determined and the formation type is also determined based on the final slowness density of the fundamental mode. In one or more of such embodiments, slowness density curves of the waves that are generated from each firing of the multi-firings are determined from the slowness of refracted shears or weak-dispersive high order modes of the respective waves, and the formation type is determined based on the slowness density curves and the properties of the curves. In one or more of such embodiments, a final slowness density is determined for each wave of the waves that are generated from each firing of the multi-firings, and the formation type is determined based on the final slowness densities of the waves.

In some embodiments, the formation type of the formation is determined from the semblance map. In some embodiments, a slowness density log of the waves is generated, candidate slowness dispersion peaks are generated from the slowness density log, and the formation type is determined from the slowness dispersion peaks. As referred to herein, a slowness density log is a statistic curve of the slowness intensity for a dispersion curve on the slowness axis. In some embodiments, a type or category of each wave (e.g., whether the wave is a refracted wave, compressional wave, or shear wave; whether the wave is a first order screw wave, a second order screw wave, or a higher order screw wave, etc.) is identified based on the formation type.

An initial shear wave slowness of the waves is determined based on the properties of the waves. In some embodiments, the initial shear wave slowness is estimated based on the modal slowness and the modal category of the waves. One or more models of the waves are generated, and mismatches between the modelings of the waves and the slowness dispersion of the waves are reduced to improve or optimize the modelings of the waves. Additional descriptions of methods to estimate formation shear wave slowness from multi-firings of different types of acoustic sources and multi-mode dispersion estimation systems are provided in the paragraphs below and are illustrated in FIGS. 1-5.

Figure 1A:
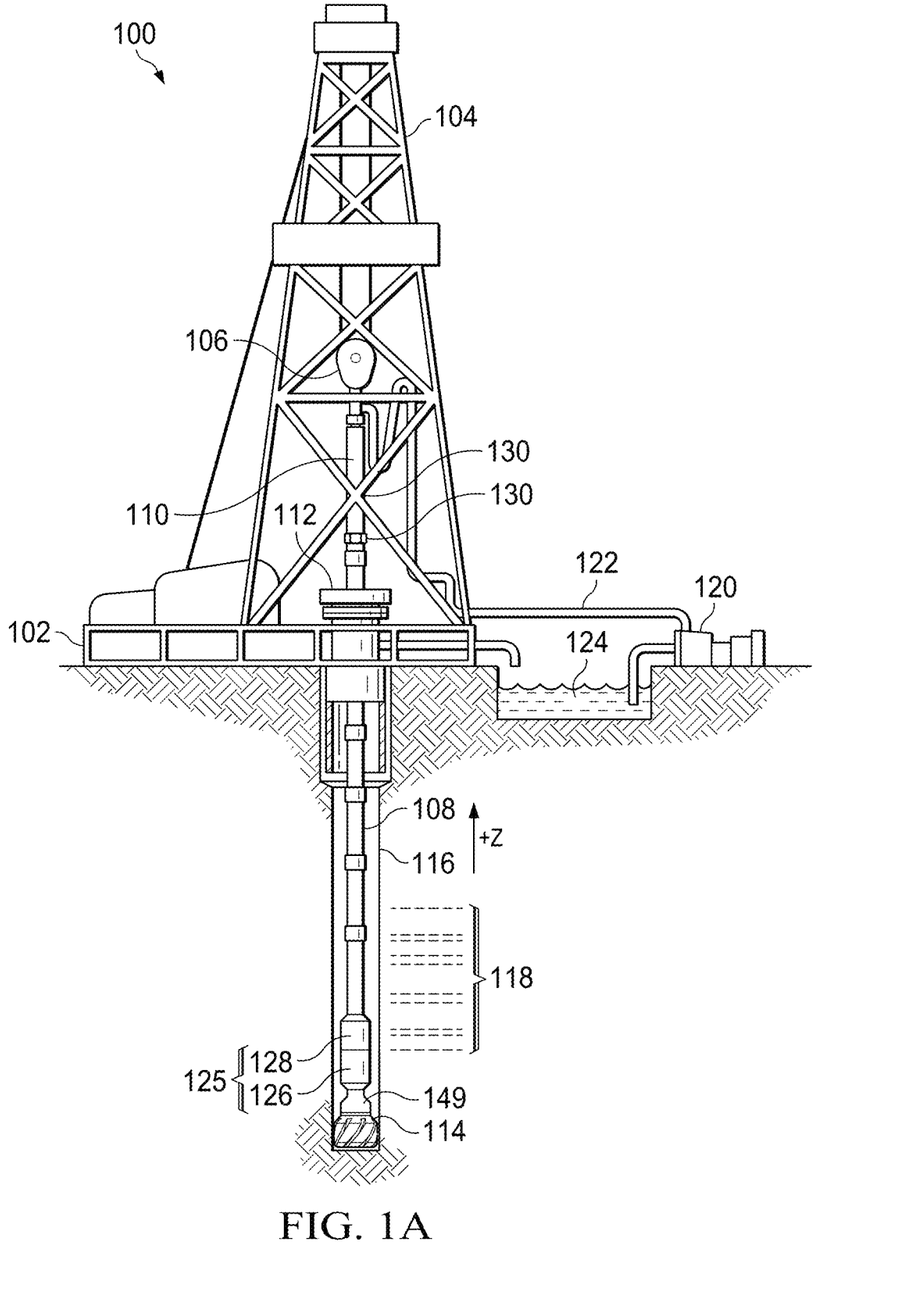
FIG. 1A illustrates a diagrammatic view of an example logging-while-drilling wellbore operating environment.

Turning now to the figures, FIG. 1A illustrates a diagrammatic view of an exemplary logging-while-drilling and/or measurement-while-drilling wellbore operating environment 100 in which the present disclosure may be implemented. As depicted in FIG. 1A, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into retention pit 124 and aids in maintaining the integrity of the wellbore 116. Various materials can be used for drilling fluid, including oil-based fluids and water-based fluids.

As depicted in FIG. 1A, logging tools 126 are integrated into the bottom-hole assembly 125 near the drill bit 114. As the drill bit 114 extends to the wellbore 116 through the various formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered. Notably, one or more of the bottom-hole assembly 125, the logging tools 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools configured to perform acoustic (e.g., "sonic") logging. Moreover, the logging tool 126 is configured to perform multi-firings of different types of acoustic sources, including, but not limited to, monopole, dipole, quadruple, hexapole, octupole signals that are transmitted into a downhole formation. The telemetry sub 128 may include wireless telemetry or logging capabilities, or both, such as to transmit or later provide information indicative of received acoustic energy/waveforms to operators on the surface or for later access and data processing for the evaluation of formation 118 properties.

The logging tools 126 may also include one or more computing devices 149 communicatively coupled with one or more of the plurality of tool components. The computing device 149 may be configured to control or monitor the performance of the logging tools 126, process logging data, and/or carry out the methods of the present disclosure.

In some embodiments, one or more of the logging tools 126 may communicate with a surface receiver 130, such as a wired drill pipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drill pipe. In at least some instances, the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 1B:
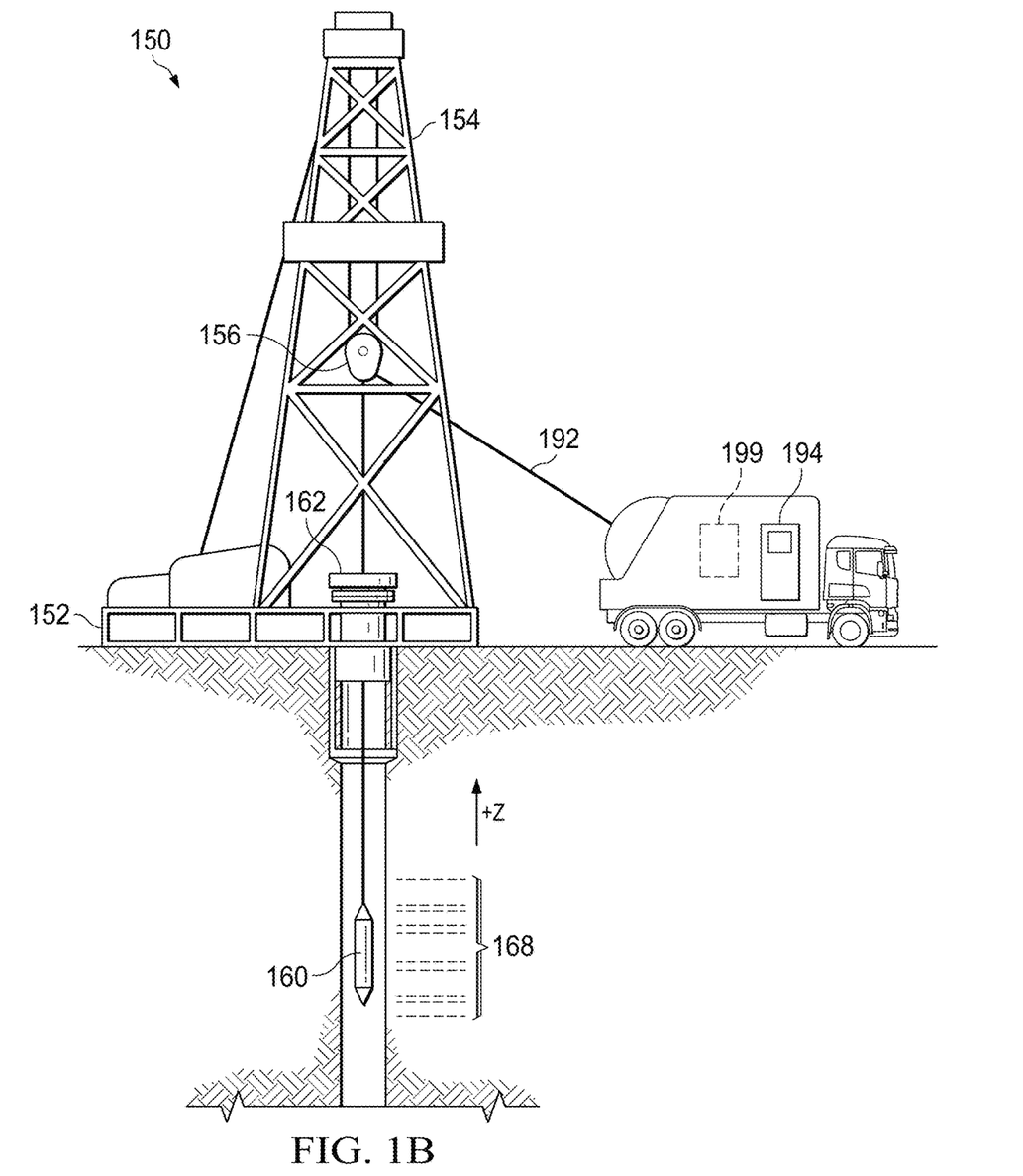
FIG. 1B illustrates a diagrammatic view of an example wireline logging wellbore operating environment.

FIG. 1B illustrates a diagrammatic view of a conveyance logging wellbore operating environment 150 in which the present disclosure may be implemented. As depicted in FIG. 1B, a hoist 156 may be included as a portion of a platform 152, such as that coupled to derrick 154, and used with a conveyance 192 to raise or lower equipment such as acoustic logging tool 160 through a wellhead 162 into or out of a borehole. A conveyance 192 may provide a communicative coupling between the acoustic logging tool 160 and a logging facility 194 at the surface. The conveyance 192 may include wires (one or more wires), slicklines, cables, or the like, as well as tubular conveyances such as coiled tubing, joint tubing, or other tubulars, and may include a downhole tractor. Additionally, power can be supplied via the conveyance 192 to meet power requirements of the tool. The acoustic logging tool 160 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 194 may include a computing device 199 capable of carrying out the methods and techniques of the present disclosure. In this manner, information about the formation 168 may be obtained by acoustic logging tool 160 and processed by a computing device, such as computing device 199. In some embodiments, computing device 199 is equipped to process the received information in substantially real-time, while in some embodiments, computing device 199 can be equipped to store the received information for processing at some subsequent time.

Figure 2:
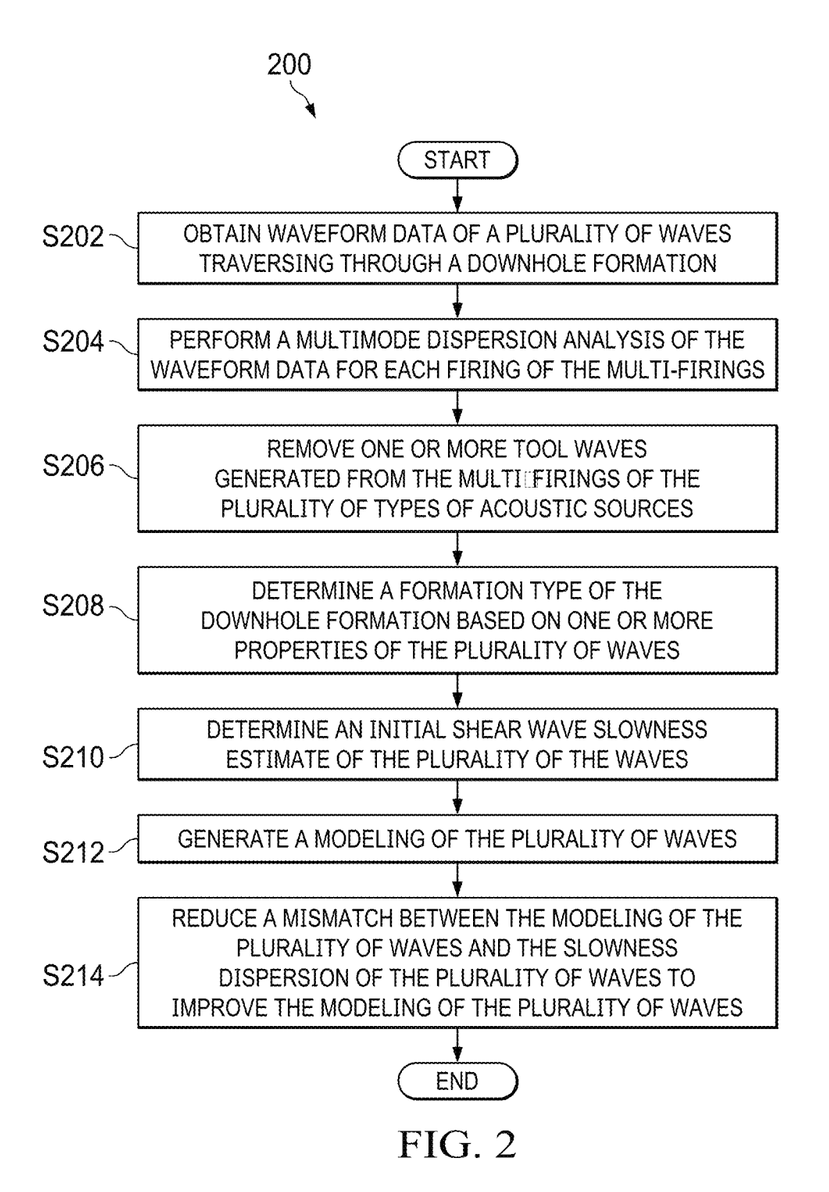
FIG. 2 is a process to estimate formation wave slowness from multi-firings of different types of acoustic sources.

FIG. 2 is a flow chart illustrating a process 200 to estimate formation wave slowness from multi-firings of different types of acoustic sources. Although the operations in process 200 are shown in a particular sequence, certain operations may be performed in different sequences or at the same time where feasible. At block S202, waveform data of a plurality of waves traversing through a downhole formation are obtained. In some embodiments, the plurality of waves are categorized as different orders of waves, where different orders of waves have different threshold cutoff frequencies. At block S204, a multimode dispersion analysis of the waveform data is performed for each firing of the multi-firings. For example, where the multi-firings include monopole, dipole, and quadrupole firings, a multimode dispersion analysis is performed for each of the monopole, dipole, and quadrupole firings. In some embodiments, the multimode dispersion analysis is utilized to generate one or more semblance maps of the plurality of waves. In one or more of such embodiments, the multimode dispersion analysis is utilized to generate a separate semblance map for each type of multi-firing. In one or more of such embodiments, peaks of the semblance maps are analyzed, and slowness dispersions of waves depicted in the semblance maps are extracted from the peaks of the semblance maps to the waves.

At block S206, one or more tool waves generated from the multi-firings of the plurality of types of acoustic sources are removed. In some embodiments, where a semblance map of one or more waves or waves associated with a type of firing (e.g., semblance map of monopole, dipole, or quadrupole firings) is generated, and the tool waves are removed from the semblance map. At block S208, a formation type of the downhole formation the waves traverse is determined based on one or more properties of the waves. Additional descriptions of operations performed in block S208 are provided below and illustrated in FIG. 3. At block S210, an initial shear wave slowness estimate of the plurality of waves is determined. At block S212, a modeling of the plurality of waves is generated. At block S214 a mismatch between the modeling of the plurality of waves and the slowness dispersion of the plurality of waves are reduced to improve the modeling of the plurality of waves.

In some embodiments, after the mismatch between the modeling of the waves and the slowness dispersion of the waves are reduced, an actual shear wave slowness and an actual slowness dispersion of the waves are determined from the modeling, and the actual shear wave slowness and actual slowness dispersion of the waves are provided to an operator to analyze the waveform data of waves generated by the multi-firings.

Figure 3:
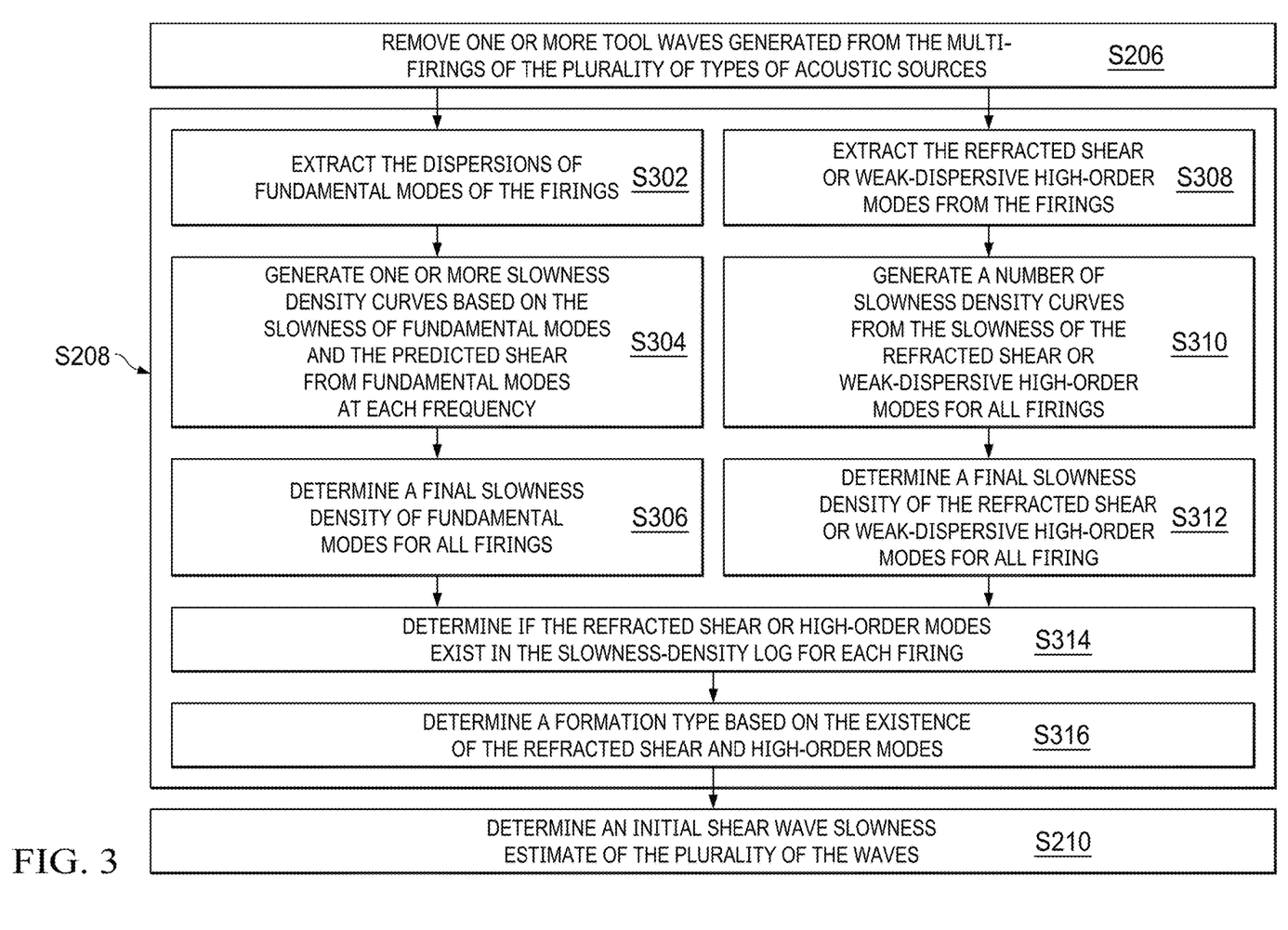
FIG. 3 is a process to determine a formation type based on one or more properties of the plurality of the waves.

FIG. 3 is a process to determine a formation type of a formation based on one or more properties of the plurality of the waves. Although the operations in the process illustrated in FIG. 3 are shown in a particular sequence, certain operations may be performed in different sequences or at the same time where feasible.

After tool waves from the multi-firings of the plurality of types of acoustic sources are removed at block S206, the process proceeds to blocks S302 and S308. At block S302, dispersions of fundamental modes of all of the firings are extracted. For example, where the firings include monopole firings and dipole firings, a first dispersion of a first fundamental mode of a first wave that is generated from a monopole firing, and a second dispersion of a second fundamental mode of a second wave that is generated from a dipole firing are extracted. Similarly, where the firings include three or more types of firings (e.g., monopole, dipole, and quadrupole firings), the dispersions of each fundamental mode of each wave that is generated from a firing type are obtained for all firings. The process then proceeds to block S304. At block S304, slowness density curves for the extracted fundamental modes are generated. Continuing with the foregoing example where the firings include monopole firings and dipole firings, a first slowness density curve and a second slowness density curve are extracted based on the first slowness of the first extracted fundamental mode and the second slowness of the second extracted fundamental mode, respectively. In some embodiments, predicted shears from extracted fundamental modes are also determined, and the slowness density curves for the extracted fundamental modes are generated based on the determined predicted shears. Continuing with the foregoing example, where the firings include monopole firings and dipole firings, a first predicted shear and a second predicted shear are determined from the first fundamental mode and the second fundamental mode, respectively. Further, the first slowness density curve and the second slowness density curve are generated based on the first predicted shear and the second predicted shear, respectively. The process then proceeds to block S306.

At block S306, final slowness densities of all of the fundamental modes are determined for all of the firings. Continuing with the foregoing example, where the firings include monopole firings and dipole firings, a final slowness density log of both the first and the second fundamental mode is determined based on both the first and the second slowness density curve.

After tool waves from the multi-firings of the plurality of types of acoustic sources are removed at block S206, the process also proceeds to block S308. At block S308, refracted shears or weak-dispersive high order modes of all of the firings are extracted. As referred to herein, high order modes refer to second or higher orders of waves. Continuing with the foregoing example, where the firings include monopole firings and dipole firings, a first dispersion of a first refracted shear or a first weak-dispersive high order mode of the first wave is generated from the monopole firing, and a second refracted shear or a second weak-dispersive high order mode of a second wave that is generated from the dipole firing are extracted. Similarly, where the firings include three or more types of firings (e.g., monopole, dipole, and quadrupole firings), the refracted shears or weak-dispersive high order modes of each wave that is generated from a firing type are obtained for all firings. The process then proceeds to block S310. At block S310, a number of slowness density curves are generated from slowness refracted shears or weak-dispersive high-order modes for all of the firings. Continuing with the foregoing example, where the firings include monopole firings and dipole firings, a first slowness density curve is generated from a slowness of the first refracted shear or the first weak-dispersive high order mode, and a second slowness density curve is generated from a slowness of the second refracted shear or the second weak-dispersive high order mode. The process then proceeds to block S312. At block S312, final slowness densities of the refracted shears or weak-dispersive high-order modes are determined for all of the firings. Continuing with the foregoing example, where the firings include monopole firings and dipole firings, a final slowness density of both the first refracted shear or the first weak-dispersive high order mode and the second refracted shear or the second weak-dispersive high order mode is determined based on both the first and the second slowness density curve.

After blocks S306 and S312, the process proceeds to block S314. At block S314, a determination of whether the refracted shears or high-order modes exist in the slowness density log is made. Continuing with the foregoing example, where the firings include monopole firings and dipole firings, a determination is made on whether the first or the second refracted shears or the first or the second weak-dispersive high order modes exist in the slowness density log of the first or the second waves. In some embodiments, the process is performed by comparing the peaks between the fundamental wave slowness density curves in S304 and S306 and the refracted shear or weak-dispersive high-order mode slowness density curves in S310 and S312. For example, the leading peak in the final slowness density curve of S306 is first extracted as the reference shear predicted by all fundamental modes of different firings, then slowness density curves of S310 and S312 are examined to determine whether the curves have peaks near the reference shear. The process then proceeds to block S316. As block S316, the formation type is determined based on the existence of the refracted shear and high order modes in waves generated from different types of firings. If more than one slowness density curves of S310 and S312 show peaks near the reference shear by the leading peak of S306, then the formation is determined as a fast-type formation, otherwise, the formation is determined as a slow-type formation. The foregoing operations introduces a cross-checking process to more accurately determine the presence of certain waves (such as refracted shear waves) that are not detected through certain types of firings (e.g., quadruple firings), but are detected through other types of firings (e.g., monopole firings), thereby improving accuracy. The process then proceeds from block S316 to block S210 and the initial shear wave slowness of the waves are determined. For a fast-type formation, the initial shear wave slowness may be picked from the maximum of the final slowness density curve of the refracted shear and high-order modes. For a slow-type formation, the initial shear wave slowness may be picked from the leading peak of the final slowness density curve of the fundamental modes. In some embodiments, operations at blocks S302 and S308 are performed simultaneously. In some embodiments, operations at one of blocks S302 and S308 are performed before the operations of the other block S302 or S308 are performed. Although the process illustrated in FIG. 3 describes extracting shear waves, determining a slowness density of shear waves, determining the existence of shear waves in a slowness density log, and other operations involving shear waves, in some embodiments, the operations described herein are also performed for compressional waves.

Figure 4A:
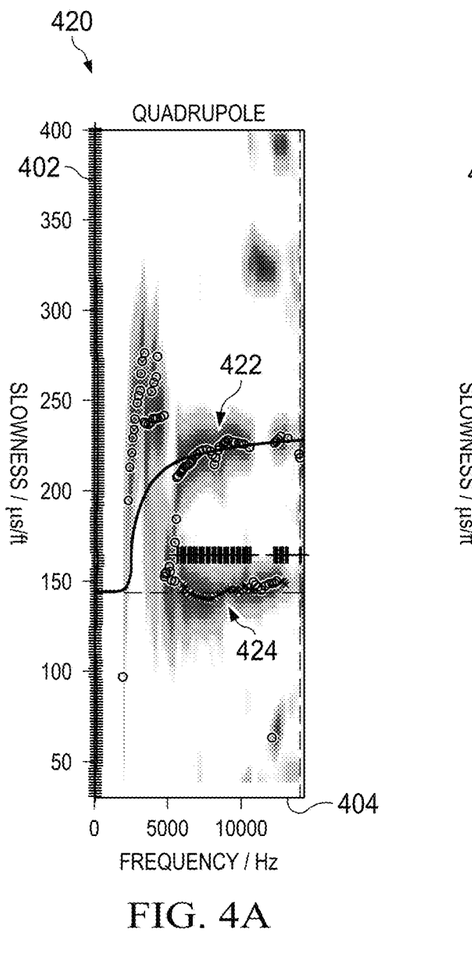
FIG. 4A is a dispersion map of waves generated from quadrupole firings.
Figure 4B:
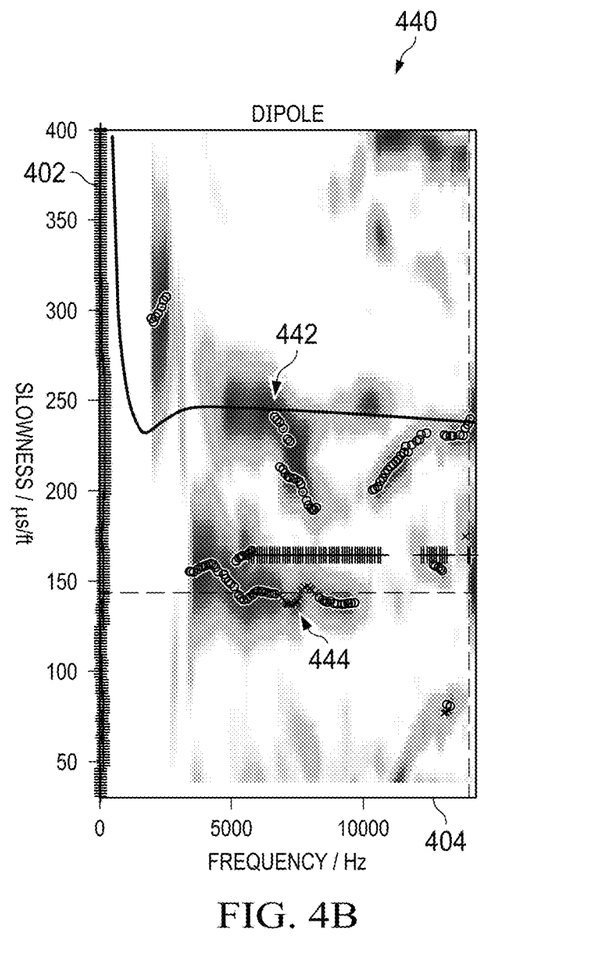
FIG. 4B is a dispersion map of waves generated from dipole firings.
Figure 4C:
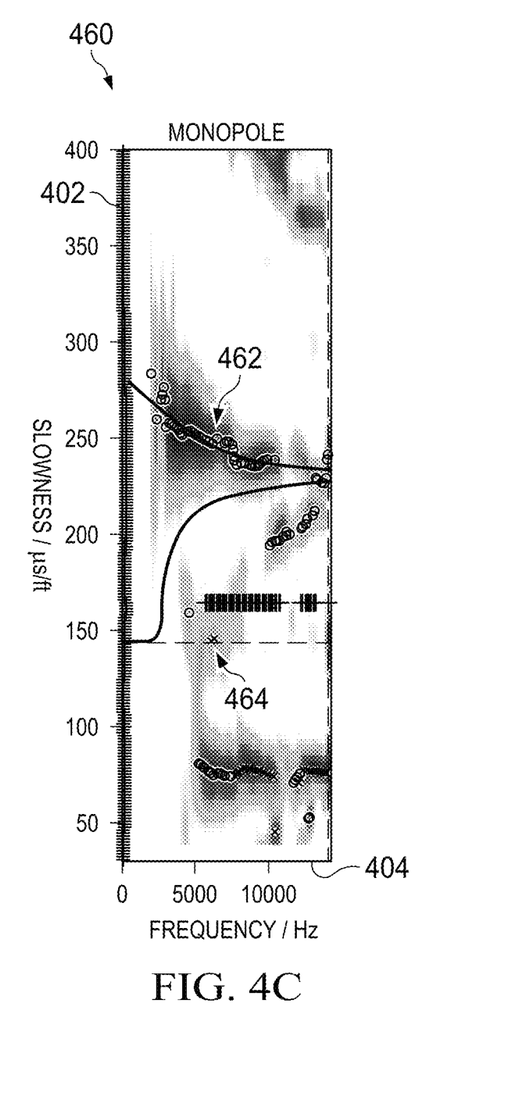
FIG. 4C is a dispersion map of waves generated from monopole firings.

FIGS. 4A-4C are dispersion maps 420, 440, and 460 of waves generated from quadrupole firings, dipole firings, and monopole firings, respectively. In the embodiment of FIGS. 4A-4C. axis 402 represents the slowness of a wave, whereas axis 404 represents the frequency of the wave. In FIG. 4A, a screw wave 422 and a refracted shear 424 are present in dispersion map 420, which captures waves generated from a quadrupole firing. In FIG. 4B, a flexural wave 442 and a refracted shear 444 are present in dispersion map 440, which captures waves generated from a dipole firing. In FIG. 4C, a Stoneley wave 462 and a refracted shear 464 are present in dispersion map 460, which captures waves generated from a monopole firing. As shown in FIGS. 4A-4C, the quadrupole refracted shear 424 and dipole refracted shear 444 are clearly illustrated in FIGS. 4A and 4B, respectively, however the monopole refracted shear 464 is less observable in dispersion map 460.

Figure 4D:
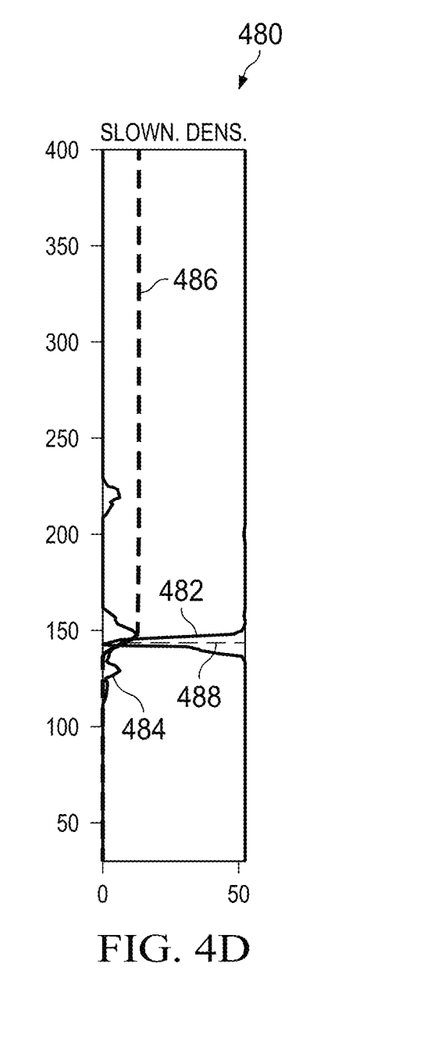

FIG. 4D is a slowness density map 480 for the waves of FIGS. 4A-4C and generated from the quadrupole, dipole, and monopole firings, where curve 484 represents the slowness density curve of the refracted shear of 424, 444, and 464; and the curve 488 is the slowness density curve of the predicted shear from the modal waves of 422, 442 and 462. Line 482 represents the final slowness density curve of the refracted shear from all the firings and line 484 represents the final slowness density curve of all fundamental modes from all the firings. Further, dashed line 486 represents fitting results, and line 488 represents the final formation shear wave slowness of the processing. The formation traversed by waves illustrated in FIGS. 4A-4D is classified as a fast formation, as both the quadrupole of refracted shear 424, the dipole of refracted shear 444 and the final slowness density of all firings of 482 shows peaks near the leading peak of 484, and the initial shear slowness of 145 us/ft is estimated from the leading peak of the combined refracted-shear slowness-density log of 482 in FIG. 4D. Further, the final shear slowness is estimated by reducing or minimizing the misfit between modeling and measurements for screw, flexural, and refracted shear waves of all of the firings.

Figure 5:
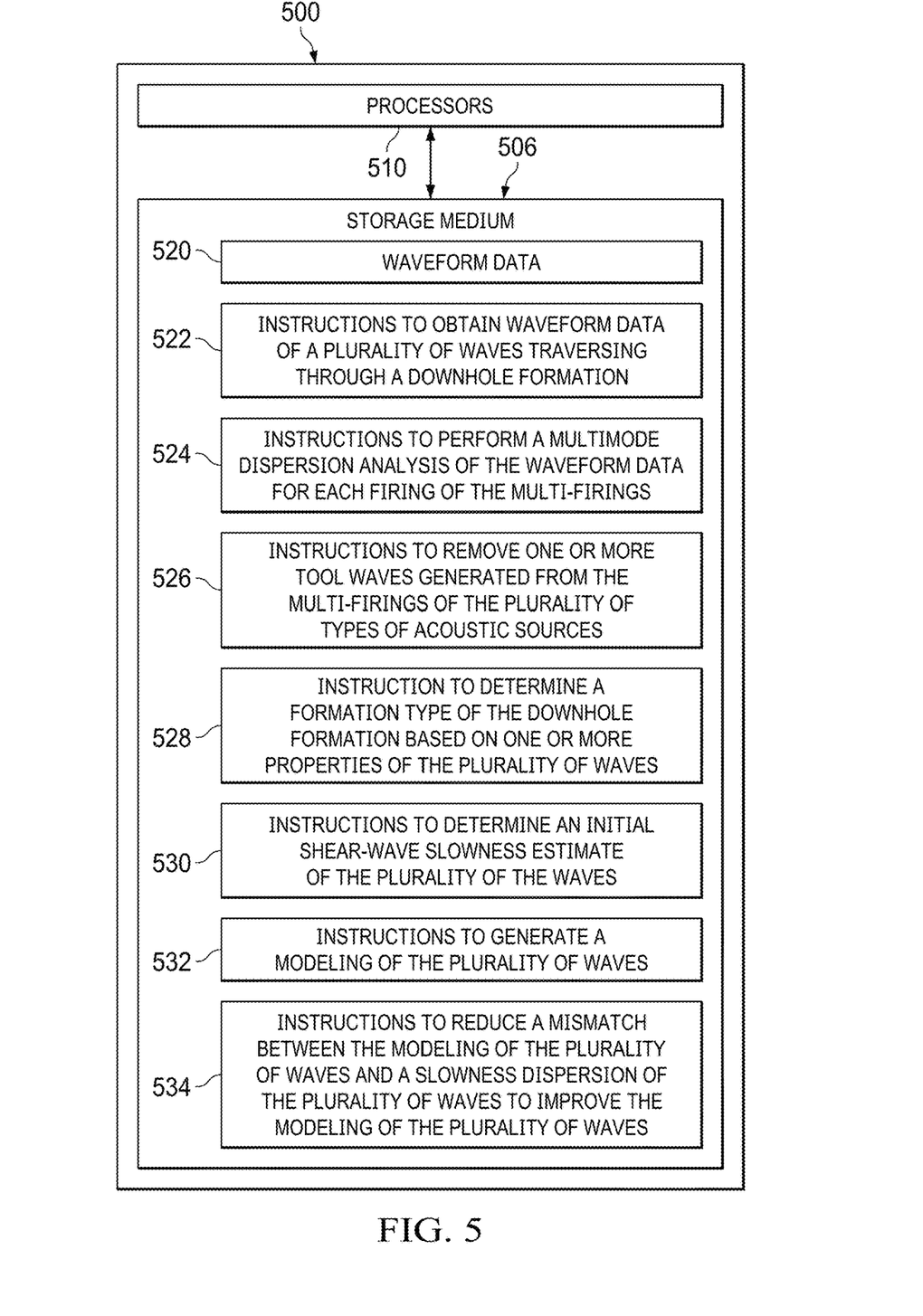
FIG. 5 is a block diagram of a multi-mode dispersion estimation system.

FIG. 5 is a block diagram of a multi-mode dispersion estimation system 500. Multi-mode dispersion estimation system 500 includes a storage medium 506 and processors 510. Storage medium 506 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 506 includes multiple data storage devices. In further embodiments, the multiple data storage devices may be physically stored at different locations. Waveform data, data associated with the downhole formation, data associated with different tool operation configurations including, but not limited to, operating in monopole, dipole, quadrupole, hexapole, and octupole firings, and other types of firings, and data obtained from logging-while-drilling and wireline logging operations are stored at a first location 520 of storage medium 506. As shown in FIG. 5, instructions to obtain waveform data of a plurality of waves traversing through a downhole formation are stored at a second location 522 of storage medium 506. Further, instructions to perform a multimode dispersion analysis of the waveform data for each firing of the multi-firings are stored at a third location 524 of the storage medium 506. Further, instructions to remove one or more tool waves generated from the multi-firings of the plurality of types of acoustic sources are stored at a fourth location 526 of storage medium 506. Further, instructions to determine a formation type of a downhole formation the plurality of waves traverse based on one or more properties of the plurality of waves are stored at a fifth location 528 of storage medium 506. Further, instructions to determine an initial shear wave slowness estimate of the plurality of waves are stored at a sixth location 530 of storage medium 506. Further, instructions to generate a modeling of the plurality of waves are stored at a seventh location 532 of storage medium 506. Further, instructions to reduce a mismatch between the modeling of the plurality of waves and the slowness dispersion of the plurality of waves to improve the modeling of the plurality of waves are stored at an eighth location 534 of storage medium 506. The instructions to perform other operations described herein are also stored in the storage medium 506.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a method to estimate formation shear wave slowness from a plurality of types of acoustic sources, the method comprising: obtaining waveform data of a plurality of waves traversing through a downhole formation, wherein the plurality of waves are generated from multi-firings of a plurality of types of acoustic sources; performing a multimode dispersion analysis of the waveform data for each firing of the multi-firings; removing one or more tool waves generated from the multi-firings of the plurality of types of acoustic sources; determining a formation type of the downhole formation based on one or more properties of the plurality of waves; determining an initial shear wave slowness estimate of the plurality of the waves; generating a modeling of the plurality of waves; and reducing a mismatch between the modeling of the plurality of waves and a slowness dispersion of the plurality of waves to improve the modeling of the plurality of waves.

Clause 2, the method of clause 1, wherein after reducing the mismatch between the modeling of the plurality of waves and the slowness dispersion of the plurality of waves, the method further comprising: determining an actual shear wave slowness from the modeling; and determining an actual slowness dispersion of the plurality of waves from the modeling.

Clause 3, the method of clauses 1 or 2, wherein determining the type of the downhole formation comprises: extracting a first dispersion of a first fundamental mode of a first wave of the plurality of waves that is generated from a first acoustic source of the plurality of acoustic sources; extracting a second dispersion of a second fundamental mode of a second wave of the plurality of waves that is generated from a second acoustic source of the plurality of acoustic sources that is different from the first acoustic source; extracting a first refracted shear or a first weak-dispersive high order mode of the first wave; extracting a second refracted shear or a second weak-dispersive high order mode of the second wave; determining whether the first or the second refracted shears or the first or the second weak-dispersive high order modes exist in a slowness density log of the first or the second waves; and determining the formation type based on an existence of the first or the second refracted shears or the first or the second weak-dispersive high order modes in the first or the second waves.

Clause 4, the method of clause 3, wherein determining the type of the downhole formation comprises: extracting a third dispersion of a third fundamental mode of a third wave of the plurality of waves that is generated from a third acoustic source of the plurality of acoustic sources that is different from the first acoustic source and the second acoustic source; extracting a third refracted shear or a third weak-dispersive high order mode of the third wave; determining whether the first, the second, or the third refracted shears or the first, the second, or the third weak-dispersive high order modes exist in a slowness density log of the first, the second, or the third waves; and determining the formation type based on an existence of the first, the second, or the third refracted shears or the first, the second, or the third weak-dispersive high order modes in the first, the second, or the third waves.

Clause 5, the method of clause 4, wherein the first acoustic source is a monopole acoustic source, wherein the second acoustic source is a dipole acoustic source, and wherein the third acoustic source is a quadrupole acoustic source.

Clause 6, the method of any of clauses 3-5, further comprising: generating a first slowness density curve based on a first slowness of the first fundamental mode; generating a second slowness density curve based on a second slowness of the second fundamental mode; and determining the formation type based on the first slowness density curve and the second slowness density curve.

Clause 7, the method of clause 6, further comprising: determining a first predicted shear from the first fundamental mode and a second predicted shear from the second fundamental mode; generating the first slowness density curve based on the first predicted shear; and generating the second slowness density curve based on the second predicted shear.

Clause 8, the method of clause 7, further comprising: determining a first final slowness density of the first fundamental mode; determining a second final slowness density of the second fundamental mode; and determining the formation type based on the first final slowness density and the second final slowness density.

Clause 9, the method of any of clauses 3-8, further comprising: generating a first slowness density curve from a slowness of the first refracted shear or the first weak-dispersive high order mode; generating a second slowness density curve from a slowness of the second refracted shear or the second weak-dispersive high order mode; and determining the formation type based on the first slowness density curve and the second slowness density curve.

Clause 10, the method of clause 9, further comprising: determining a first final slowness density of the first refracted shear or the first weak-dispersive high order mode; determining second final slowness density of the second refracted shear or the second weak-dispersive high order mode; and determining the formation type based on the first final slowness density and the second final slowness density.

Clause 11, the method of any of clauses 1-10, wherein the plurality of types of acoustic sources comprises at least two of monopole, dipole, quadrupole, hexapole, and octupole acoustic sources.

Clause 12, the method of clause 11, wherein the acoustic sources are sequentially fired one after another.

Clause 13, the method of any of clauses 1-12, further comprising: generating one or more semblance maps of one or more waves of the plurality of waves; for each semblance map of the one or more semblance maps: analyzing one or more peaks of the respective semblance map; and extracting a slowness dispersion of a wave from the one or more peaks of the respective semblance map to obtain the slowness dispersion of the wave.

Clause 14, a multi-mode dispersion estimation system, comprising: a storage medium; and one or more processors configured to: obtain waveform data of a plurality of waves traversing through a downhole formation, wherein the plurality of waves are generated from multi-firings of a plurality of types of acoustic sources; perform a multimode dispersion analysis of the waveform data for each firing of the multi-firings; remove one or more tool waves generated from the multi-firings of the plurality of types of acoustic sources; determine a formation type of the downhole formation based on one or more properties of the plurality of the waves; determine an initial shear wave slowness estimate of the plurality of waves; generate a modeling of the plurality of waves; and reduce a mismatch between the modeling of the plurality of waves and the slowness dispersion of the plurality of waves to improve the modeling of the plurality of waves.

Clause 15, the multi-mode dispersion estimation system of clause 14, wherein the one or more processors are further configured to: determine an actual shear wave slowness from the modeling; and determine an actual slowness dispersion of the plurality of waves from the modeling.

Clause 16, the multi-mode dispersion estimation system of clause 15, wherein the one or more processors are further configured to: extract a first dispersion of a first fundamental mode of a first wave of the plurality of waves that is generated from a first acoustic source of the plurality of acoustic sources; extract a second dispersion of a second fundamental mode of a second wave of the plurality of waves that is generated from a second acoustic source of the plurality of acoustic sources that is different from the first acoustic source; extract a third dispersion of a third fundamental mode of a third wave of the plurality of waves that is generated from a third acoustic source of the plurality of acoustic sources that is different from the first acoustic source and the second acoustic source; extract a first refracted shear or a first weak-dispersive high order mode of the first wave; extract a second refracted shear or a second weak-dispersive high order mode of the second wave; extract a third refracted shear or a third weak-dispersive high order mode of the third wave; determine whether the first, the second, or the third refracted shears or the first, the second, or the third weak-dispersive high order modes exist in a slowness density log of the first, the second, or the third waves; and determine the formation type based on an existence of the first, the second, or the third refracted shears or the first, the second, or the third weak-dispersive high order modes in the first, the second, or the third waves.

Clause 17, the multi-mode dispersion estimation system of clauses 15 or 16, wherein the one or more processors are further configured to: generate a first slowness density curve based on a first slowness of the first fundamental mode and a first predicted shear from the first fundamental mode; generate a second slowness density curve based on a second slowness of the second fundamental mode and a second predicted shear from the second fundamental mode; generate a third slowness density curve based on a third slowness of the third fundamental mode and a third predicted shear from the third fundamental mode; and determine the formation type based on the first slowness density curve, the first predicted shear, the second slowness density curve, the second predicted shear, the third slowness density curve, and the third predicted shear.

Clause 18, the multi-mode dispersion estimation system of any of clauses 15-17, wherein the one or more processors are further configured to: determine a first final slowness density of the first fundamental mode; determine a second final slowness density of the second fundamental mode; determine a third final slowness density of the third fundamental mode; and determine the formation type based on the first final slowness density, the second final slowness density, and the third slowness density.

Clause 19, a non-transitory machine readable medium having one or more instructions which, when executed by a processor, cause the processors to perform operations comprising: obtaining waveform data of a plurality of waves traversing through a downhole formation, wherein the plurality of waves are generated from multi-firings of a plurality of types of acoustic sources; performing a multimode dispersion analysis of the waveform data for each firing of the multi-firings; removing one or more tool waves generated from the multi-firings of the plurality of types of acoustic sources; determining a formation type of the downhole formation based on one or more properties of the plurality of the waves; determining an initial shear wave slowness estimate of the plurality of waves; generating a modeling of the plurality of waves; reducing a mismatch between the modeling of the plurality of waves and a slowness dispersion of the plurality of waves to improve the modeling of the plurality of waves; determining an actual shear wave slowness from the modeling; and determining an actual slowness dispersion of the plurality of waves from the modeling.

Clause 20, the non-transitory machine readable medium of clause 19, wherein the instructions which, when executed by the processor, cause the processor to further perform operations comprising: extracting a first dispersion of a first fundamental mode of a first wave of the plurality of waves that is generated from a first acoustic source of the plurality of acoustic sources; extracting a second dispersion of a second fundamental mode of a second wave of the plurality of waves that is generated from a second acoustic source of the plurality of acoustic sources that is different from the first acoustic source; extracting a third dispersion of a third fundamental mode of a third wave of the plurality of waves that is generated from a third acoustic source of the plurality of acoustic sources that is different from the first acoustic source and the second acoustic source; extracting a first refracted shear or a first weak-dispersive high order mode of the first wave; extracting a second refracted shear or a second weak-dispersive high order mode of the second wave; extracting a third refracted shear or a third weak-dispersive high order mode of the third wave; determining whether the first, the second, or the third refracted shears or the first, the second, or the third weak-dispersive high order modes exist in a slowness density log of the first, the second, or the third waves; and determining the formation type based on an existence of the first, the second, or the third refracted shears or the first, the second, or the third weak-dispersive high order modes in the first, the second, or the third waves.

As used herein, the singular forms "a," "an," and "the" are intended to include the plural forms as well, unless the context clearly indicates otherwise. It will be further understood that the terms "comprise" and/or "comprising." when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to estimate formation shear wave slowness from a plurality of types of acoustic sources, the method comprising:
    obtaining waveform data of a plurality of waves traversing through a downhole formation, wherein the plurality of waves are generated from multi-firings of a plurality of types of acoustic sources;
    performing a multimode dispersion analysis of the waveform data for each firing of the multi-firings;
    removing one or more tool waves generated from the multi-firings of the plurality of types of acoustic sources;
    determining a formation type of the downhole formation based on one or more properties of the plurality of waves;
    determining an initial shear wave slowness estimate of the plurality of the waves;
    generating a modeling of the plurality of waves; and
    reducing a mismatch between the modeling of the plurality of waves and a slowness dispersion of the plurality of waves to improve the modeling of the plurality of waves,
    wherein determining the type of the downhole formation comprises determining the formation type based on an existence of a first refracted shear or a first weak-dispersive high order mode in a first wave of the plurality of waves that is generated from a first acoustic source of the plurality of acoustic sources, or a second refracted shear or a second weak-dispersive high order mode in a second wave of the plurality of waves that is generated from a second acoustic source of the plurality of acoustic sources that is different from the first acoustic source.

2. The method of claim 1, wherein after reducing the mismatch between the modeling of the plurality of waves and the slowness dispersion of the plurality of waves, the method further comprising:
    determining an actual shear wave slowness from the modeling; and
    determining an actual slowness dispersion of the plurality of waves from the modeling.

3. The method of claim 1, wherein determining the type of the downhole formation comprises:
    extracting a first dispersion of a first fundamental mode of the first wave;
    extracting a second dispersion of a second fundamental mode of the second wave of;
    extracting the first refracted shear or the first weak-dispersive high order mode of the first wave;
    extracting the second refracted shear or the second weak-dispersive high order mode of the second wave;
    determining whether the first or the second refracted shears or the first or the second weak-dispersive high order modes exist in a slowness density log of the first or the second waves; and
    determining the formation type based on an existence of the first or the second refracted shears or the first or the second weak-dispersive high order modes in the first or the second waves.

4. The method of claim 3, wherein determining the type of the downhole formation comprises:
    extracting a third dispersion of a third fundamental mode of a third wave of the plurality of waves that is generated from a third acoustic source of the plurality of acoustic sources that is different from the first acoustic source and the second acoustic source;
    extracting a third refracted shear or a third weak-dispersive high order mode of the third wave;
    determining whether the first, the second, or the third refracted shears or the first, the second, or the third weak-dispersive high order modes exist in the slowness density log of the first, the second, or the third waves; and
    determining the formation type based on an existence of the first, the second, or the third refracted shears or the first, the second, or the third weak-dispersive high order modes in the first, the second, or the third waves.

5. The method of claim 4, wherein the first acoustic source is a monopole acoustic source, wherein the second acoustic source is a dipole acoustic source, and wherein the third acoustic source is a quadrupole acoustic source.

6. The method of claim 3, further comprising:
    generating a first slowness density curve based on a first slowness of the first fundamental mode;
    generating a second slowness density curve based on a second slowness of the second fundamental mode; and
    determining the formation type based on the first slowness density curve and the second slowness density curve.

7. The method of claim 6, further comprising:
    determining a first predicted shear from the first fundamental mode and a second predicted shear from the second fundamental mode;
    generating the first slowness density curve based on the first predicted shear; and
    generating the second slowness density curve based on the second predicted shear.

8. The method of claim 7, further comprising:
    determining a first final slowness density of the first fundamental mode;
    determining a second final slowness density of the second fundamental mode; and
    determining the formation type based on the first final slowness density and the second final slowness density.

9. The method of claim 3, further comprising:
    generating a first slowness density curve from a slowness of the first refracted shear or the first weak-dispersive high order mode;

generating a second slowness density curve from a slowness of the second refracted shear or the second weak-dispersive high order mode; and
determining the formation type based on the first slowness density curve and the second slowness density curve.

10. The method of claim 9, further comprising:
determining a first final slowness density of the first refracted shear or the first weak-dispersive high order mode;
determining second final slowness density of the second refracted shear or the second weak-dispersive high order mode; and
determining the formation type based on the first final slowness density and the second final slowness density.

11. The method of claim 1, wherein the plurality of types of acoustic sources comprises at least two of monopole, dipole, quadrupole, hexapole, and octupole acoustic sources.

12. The method of claim 11, wherein the acoustic sources are sequentially fired one after another.

13. The method of claim 1, further comprising:
generating one or more semblance maps of one or more waves of the plurality of waves;
for each semblance map of the one or more semblance maps:
analyzing one or more peaks of the respective semblance map; and
extracting a slowness dispersion of a wave from the one or more peaks of the respective semblance map to obtain the slowness dispersion of the wave.

14. A multi-mode dispersion estimation system, comprising:
a storage medium; and
one or more processors configured to:
obtain waveform data of a plurality of waves traversing through a downhole formation, wherein the plurality of waves are generated from multi-firings of a plurality of types of acoustic sources;
perform a multimode dispersion analysis of the waveform data for each firing of the multi-firings;
remove one or more tool waves generated from the multi-firings of the plurality of types of acoustic sources;
determine a formation type of the downhole formation based on one or more properties of the plurality of the waves;
determine an initial shear wave slowness estimate of the plurality of waves;
generate a modeling of the plurality of waves; and
reduce a mismatch between the modeling of the plurality of waves and the slowness dispersion of the plurality of waves to improve the modeling of the plurality of waves,
wherein the formation type of the downhole formation is determined based on the formation type based on an existence of a first refracted shear or a first weak-dispersive high order mode in a first wave of the plurality of waves that is generated from a first acoustic source of the plurality of acoustic sources, or a second refracted shear or a second weak-dispersive high order mode in a second wave of the plurality of waves that is generated from a second acoustic source of the plurality of acoustic sources that is different from the first acoustic source.

15. The multi-mode dispersion estimation system of claim 14, wherein the one or more processors are further configured to:
determine an actual shear wave slowness from the modeling; and
determine an actual slowness dispersion of the plurality of waves from the modeling.

16. The multi-mode dispersion estimation system of claim 15, wherein the one or more processors are further configured to:
extract a first dispersion of a first fundamental mode of the first wave;
extract a second dispersion of a second fundamental mode of the second wave;
extract a third dispersion of a third fundamental mode of a third wave of the plurality of waves that is generated from a third acoustic source of the plurality of acoustic sources that is different from the first acoustic source and the second acoustic source;
extract the first refracted shear or the first weak-dispersive high order mode of the first wave;
extract the second refracted shear or the second weak-dispersive high order mode of the second wave;
extract a third refracted shear or a third weak-dispersive high order mode of the third wave;
determine whether the first, the second, or the third refracted shears or the first, the second, or the third weak-dispersive high order modes exist in a slowness density log of the first, the second, or the third waves; and
determine the formation type based on an existence of the first, the second, or the third refracted shears or the first, the second, or the third weak-dispersive high order modes in the first, the second, or the third waves.

17. The multi-mode dispersion estimation system of claim 16, wherein the one or more processors are further configured to:
generate a first slowness density curve based on a first slowness of the first fundamental mode and a first predicted shear from the first fundamental mode;
generate a second slowness density curve based on a second slowness of the second fundamental mode and a second predicted shear from the second fundamental mode;
generate a third slowness density curve based on a third slowness of the third fundamental mode and a third predicted shear from the third fundamental mode; and
determine the formation type based on the first slowness density curve, the first predicted shear, the second slowness density curve, the second predicted shear, the third slowness density curve, and the third predicted shear.

18. The multi-mode dispersion estimation system of claim 16, wherein the one or more processors are further configured to:
determine a first final slowness density of the first fundamental mode;
determine a second final slowness density of the second fundamental mode;
determine a third final slowness density of the third fundamental mode; and
determine the formation type based on the first final slowness density, the second final slowness density, and the third slowness density.

19. A non-transitory machine readable medium having one or more instructions which, when executed by a processor, cause the processor to perform operations comprising:
obtaining waveform data of a plurality of waves traversing through a downhole formation, wherein the plurality of waves are generated from multi-firings of a plurality of types of acoustic sources;

performing a multimode dispersion analysis of the waveform data for each firing of the multi-firings;

removing one or more tool waves generated from the multi-firings of the plurality of types of acoustic sources;

determining a formation type of the downhole formation based on one or more properties of the plurality of the waves;

determining an initial shear wave slowness estimate of the plurality of waves;

generating a modeling of the plurality of waves;

reducing a mismatch between the modeling of the plurality of waves and a slowness dispersion of the plurality of waves to improve the modeling of the plurality of waves;

determining an actual shear wave slowness from the modeling; and determining an actual slowness dispersion of the plurality of waves from the modeling, wherein determining the type of the downhole formation comprises determining the formation type based on an existence of a first refracted shear or a first weak-dispersive high order mode in a first wave of the plurality of waves that is generated from a first acoustic source of the plurality of acoustic sources, or a second refracted shear or a second weak-dispersive high order mode in a second wave of the plurality of waves that is generated from a second acoustic source of the plurality of acoustic sources that is different from the first acoustic source.

20. The non-transitory machine readable medium of claim 19, wherein the instructions which, when executed by the processor, cause the processor to further perform operations comprising:

extracting a first dispersion of a first fundamental mode of the first wave;

extracting a second dispersion of a second fundamental mode of the second wave;

extracting a third dispersion of a third fundamental mode of a third wave of the plurality of waves that is generated from a third acoustic source of the plurality of acoustic sources that is different from the first acoustic source and the second acoustic source;

extracting the first refracted shear or the first weak-dispersive high order mode of the first wave;

extracting the second refracted shear or the second weak-dispersive high order mode of the second wave;

extracting a third refracted shear or a third weak-dispersive high order mode of the third wave;

determining whether the first, the second, or the third refracted shears or the first, the second, or the third weak-dispersive high order modes exist in a slowness density log of the first, the second, or the third waves; and determining the formation type based on an existence of the first, the second, or the third refracted shears or the first, the second, or the third weak-dispersive high order modes in the first, the second, or the third waves.

* * * * *

UNITED STATES PATENT AND TRADEMARK OFFICE
CERTIFICATE OF CORRECTION

| | | |
|---|---|---|
| PATENT NO. | : 11,656,379 B2 | Page 1 of 1 |
| APPLICATION NO. | : 17/463039 | |
| DATED | : May 23, 2023 | |
| INVENTOR(S) | : Ruijia Wang et al. | |

It is certified that error appears in the above-identified patent and that said Letters Patent is hereby corrected as shown below:

In the Specification

Column 14, Line 6, delete "of".
Column 15, Line 10, after 'determining,' insert --a--.

Signed and Sealed this
Twenty-sixth Day of December, 2023

*Katherine Kelly Vidal*

Katherine Kelly Vidal
*Director of the United States Patent and Trademark Office*